(12) United States Patent
Tsao et al.

(10) Patent No.: US 8,480,586 B2
(45) Date of Patent: Jul. 9, 2013

(54) ULTRASOUND DIAGNOSIS APPARATUS

(75) Inventors: Jing-Wen Tsao, Mitaka (JP); Takayuki Ohnishi, Mitaka (JP); Kazuhiro Amino, Mitaka (JP); Masayuki Kosuge, Mitaka (JP)

(73) Assignee: Hitachi Aloka Medical, Ltd., Mitaka-shi, Tokyo (JP)

( * ) Notice: Subject to any disclaimer, the term of this patent is extended or adjusted under 35 U.S.C. 154(b) by 1357 days.

(21) Appl. No.: 11/826,249

(22) Filed: Jul. 13, 2007

(65) Prior Publication Data

US 2008/0021323 A1 Jan. 24, 2008

(30) Foreign Application Priority Data

Jul. 18, 2006 (JP) .................................. 2006-195837
Dec. 22, 2006 (JP) .................................. 2006-346326

(51) Int. Cl.
*A61B 8/00* (2006.01)
*H01L 41/00* (2006.01)
(52) U.S. Cl.
USPC .......................................... 600/443; 310/317
(58) Field of Classification Search
None
See application file for complete search history.

(56) References Cited

U.S. PATENT DOCUMENTS

| | | | | |
|---|---|---|---|---|
| 3,900,823 A | * | 8/1975 | Sokal et al. | 330/149 |
| 4,207,772 A | * | 6/1980 | Stoller | 73/620 |
| 4,483,345 A | | 11/1984 | Miwa | |
| 5,090,245 A | * | 2/1992 | Anderson | 73/625 |
| 5,902,243 A | | 5/1999 | Holley et al. | |
| 6,190,322 B1 | | 2/2001 | Clark | |
| 6,221,018 B1 | * | 4/2001 | Ramamurthy et al. | 600/443 |
| 6,292,435 B1 | * | 9/2001 | Savord et al. | 367/138 |
| 6,350,240 B1 | * | 2/2002 | Song et al. | 600/443 |
| 6,469,957 B1 | * | 10/2002 | Savord et al. | 367/137 |
| 6,497,660 B1 | | 12/2002 | Dillman et al. | |
| 6,622,560 B2 | * | 9/2003 | Song et al. | 73/606 |

(Continued)

FOREIGN PATENT DOCUMENTS

| | | |
|---|---|---|
| CN | 1487845 A | 4/2004 |
| JP | 2001-87263 A | 4/2001 |
| JP | 2001-245881 A | 9/2001 |
| JP | 2002-165796 A | 6/2002 |

OTHER PUBLICATIONS

Matthew F. Bruce, et al., "A Generalization of Pulse Inversion Doppler", 2000 IEEE Ultrasonics Symposium, pp. 1903-1906.

(Continued)

*Primary Examiner* — Long V. Le
*Assistant Examiner* — Angela M Hoffa
(74) *Attorney, Agent, or Firm* — Westerman, Hattori, Daniels & Adrian, LLP (57) ABSTRACT

An ultrasound diagnosis apparatus having a transmission circuit which generates a transmission signal is provided. The transmission signal corresponds to a combined waveform of a trapezoidal waveform and an impulse-shaped waveform (impulse portion). In an example transmission signal, a front slope portion, a flat portion, and a rear slope portion exist in a positive polarity side. The impulse portion has a shape which protrudes from an offset level over a base line into an opposite polarity side. Because the center frequency of the trapezoidal wave form is near the DC component, the trapezoidal wave form can substantially be ignored. The impulse portion has a large amplitude, but because the impulse portion exists over both polarities, there is no need to apply a special high voltage countermeasure for each polarity in designing the transmission circuit. A trapezoidal wave form of an opposite polarity may be added in front of the trapezoidal waveform.

14 Claims, 9 Drawing Sheets

U.S. PATENT DOCUMENTS

| | | | |
|---|---|---|---|
| 6,786,097 B2 * | 9/2004 | Song et al. ................... 73/602 |
| 7,022,074 B2 * | 4/2006 | Kristoffersen et al. ....... 600/437 |
| 7,037,265 B2 * | 5/2006 | Hao et al. ................... 600/447 |
| 7,604,600 B2 * | 10/2009 | Umemura et al. ............ 600/458 |
| 7,698,948 B2 * | 4/2010 | Asafusa et al. ................ 73/627 |
| 7,883,466 B2 * | 2/2011 | Adachi et al. ................ 600/437 |
| 2001/0016685 A1 * | 8/2001 | Tsao et al. ................... 600/437 |
| 2004/0059219 A1 | 3/2004 | Asafusa |
| 2004/0059221 A1 | 3/2004 | Azuma et al. |

OTHER PUBLICATIONS

European Search Report dated Nov. 9, 2007, Application No. 07013042.2-2220.

Chinese Office Action dated Feb. 12, 2010, issued in corresponding Chinese Patent Application No. 2007-10136114.

* cited by examiner

ULTRASOUND DIAGNOSIS APPARATUS

BACKGROUND OF THE INVENTION

1. Field of the Invention

The present invention relates to an ultrasound diagnosis apparatus, and, in particular, to a technique for generating a waveform of a transmission signal.

2. Description of the Related Art

In ultrasound diagnosis apparatuses, a plurality of transmission signals are supplied to a plurality of transducer elements, and an ultrasound is transmitted from the plurality of transducer elements to a living body. Each transmission signal is generated by a transmission circuit, and various circuits are known as a transmission circuit (for example, refer to JP 2001-245881 A and JP 2001-087263 A). For example, there are known a circuit in which a transmission pulse is generated as a transmission signal by a simple switching and a circuit in which a waveform of a positive polarity and a waveform of a negative polarity are generated and the waveforms are combined to generate a transmission signal. In recent years, a circuit is commercialized in which a transmission signal is generated by reading a digital signal representing a transmission waveform from a memory, converting the digital signal into an analog signal, and amplifying the analog signal by a liner amplifier.

In order to improve the resolution in a depth direction (axial resolution) in an image, a transmission pulse with a narrow pulse width (that is, pulse with a broad band) must be generated. In addition, in order to improve sensitivity, it is desirable to increase a voltage of the transmission signal. In particular, because a harmonic component (in particular, second order harmonic component) included in a reception signal is weaker compared to a fundamental component by approximately −20 dB, in a harmonic imaging mode (for example, refer to JP 2002-165796 A and U.S. Pat. No. 5,902,243), improvements in sensitivity of the harmonic component is strongly desired. In general, the second order harmonic component is proportional to the square of a transmission sound pressure, and, thus, it is desired to increase the transmission sound pressure, that is, the transmission voltage.

However, when a transmission pulse of a large amplitude is formed simply as a positive polarity pulse or a negative polarity pulse, a high voltage must be generated within the transmission circuit, and a circuit structure which can tolerate such a high voltage (such as a linear amplifier having a high voltage tolerance and a switching circuit having a high voltage tolerance) must be employed.

In order to form an image of the harmonic component, it is necessary to remove the fundamental component included in the reception signal and to extract only the harmonic component. As a method of realizing this process, there are known a pulse inversion method or a phase inversion method (for example, refer to JP 2002-165796 A and U.S. Pat. No. 5,902,243 as described above). In this method, a first transmission pulse and a second transmission pulse which is an inverted pulse of the first transmission pulse are alternately transmitted and a first reception signal and a second reception signal corresponding to the first and second transmission pulses, respectively, are added. U.S. Pat. No. 6,190,322 discloses a phase inversion method in which a first asymmetric ultrasonic pulse and a second asymmetric ultrasonic pulse which is an inverted pulse of the first asymmetric ultrasonic pulse are alternately transmitted. FIG. 4 of U.S. Pat. No. 6,190,322 shows a waveform of the first asymmetric ultrasonic pulse. The asymmetric ultrasonic pulse has an extended pressure peak and two shallow pressure peaks existing before and after the extended pressure peak. The waveform, however, does not represent an electric transmission signal. U.S. Pat. No. 6,190,322 fails to disclose the use of a meaningful negative offset, in particular, generation of an electric transmission signal including a negative offset which forms a basis of an impulse portion.

SUMMARY OF THE INVENTION

An advantage of the present invention is that a novel transmission signal which can improve the image quality of an ultrasound image is generated. In particular, a transmission waveform can be generated which can be used in place of a simple pulse of a narrow pulse width and a high voltage which is formed on a side of one polarity.

Another advantage of the present invention is that a superior axial resolution and high sensitivity is realized using a transmission circuit having a typical voltage tolerance, without the use of a special transmission circuit having a high voltage tolerance.

Yet another advantage of the present invention is that a transmission signal spectrum is realized having a reduced number of ripples in a frequency band of the ultrasonic transducer.

According to one aspect of the present invention, there is provided an ultrasound diagnosis apparatus comprising an ultrasonic transducer which transmits and receives an ultrasound, and a transmitter which supplies a transmission signal to the ultrasonic transducer, wherein the transmission signal includes a gentle portion which gently changes between a base line and an offset level on one polarity side, and an impulse portion having a shape extending from the offset level, over the base line, and into an opposite polarity side.

In such a structure, a transmission signal supplied to the ultrasonic transducer includes a gentle portion (or a slope portion) and an impulse portion. The gentle portion is a portion which gently changes between a base line and an offset level on one polarity side. More specifically, the gentle portion includes two gentle transit sections existing before and after the impulse portion or includes a gentle transit section existing before or after the impulse portion. Desirably, the gentle portion is continuous from a flat portion which forms the offset level. The impulse portion has a unique shape which extends from the offset level, over the base line, and into the opposite polarity side. With this structure, the impulse rises on an opposite side, with reference on the offset level, and differs from the simple pulse of the related art which rises from the base line. In other words, with the above-described structure, an offset is used and an impulse portion is formed over (across) a base line, and, thus, it is possible to achieve a large voltage change in the overall impulse portion without increasing a voltage tolerance of the individual circuits corresponding to the positive and negative polarities (that is, without the use of a high voltage circuit). That is, the impulse portion has a pulse waveform which is equivalent to a simple pulse with a high voltage, and it is possible to realize a high sensitivity and high resolution (high axial resolution) by transmitting the pulse.

The gentle portion existing on the one polarity side is a gently changing waveform portion as described above, and a center frequency of the gentle portion is at a low band or around the DC component. In view of the relationship with the frequency band of the ultrasonic transducer, the frequency component of the gentle portion desirably does not contribute in transmission and reception or contributes only by a small amount. With the use of the gentle portion in generating the offset level, it is possible to alleviate or ignore an influence due to formation of the offset level. The offset level is a level which is substantially distant from the base line, and is desirably a level corresponding to a half or approximately a half of the impulse portion.

According to another aspect of the present invention, it is preferable that, in the ultrasound diagnosis apparatus, the gentle portion has a center frequency which is lower than a frequency band of the ultrasonic transducer. In general, when a rectangular pulse having a narrow width is used as the impulse portion, the center frequency is near the DC component, but the frequency components exist over a wide frequency range, and, in particular, the frequency component exists over the entire frequency band of the ultrasonic transducer. According to another aspect of the present invention, it is preferable that, in the ultrasound diagnosis apparatus, the gentle portion includes a front gentle transit section existing before the impulse portion and a rear gentle transit section existing after the impulse portion. The former can be defined as a rising gentle transit section and the latter can be defined as a decay gentle transit section.

According to another aspect of the present invention, it is preferable that, in the ultrasound diagnosis apparatus, the gentle portion exists in one of front or rear of the impulse portion, and the transmission signal includes a pulse-shaped portion which exists in the other of front or rear of the impulse portion and which steeply changes between the offset level and the base line. With such a structure, a steep pulse-shaped portion exists on one side of the impulse portion and the gentle portion exists on the other side of the impulse portion. With this configuration, the effect of the impulse portion can be strengthened while leaving a certain degree of the effect of the gentle portion. Thus, this configuration is useable when the sensitivity is of a higher priority than the axial resolution. A width of the pulse-shaped portion may be matched with the width of the impulse portion or may be configured to be variable.

According to another aspect of the present invention, it is preferable that, in the ultrasound diagnosis apparatus, an absolute value of an amplitude between the offset level and a peak level of the impulse portion corresponds to approximately twice an absolute value of an amplitude between the base line and the offset level. With such structure, the impulse portion becomes approximately symmetrical vertically, with the base line as a center. Therefore, the voltage tolerances of the circuits of the positive polarity side and of the negative polarity side can be set approximately equal to each other, and, thus, such a configuration is efficient.

According to another aspect of the present invention, it is preferable that, in the ultrasound diagnosis apparatus, a waveform of the transmission signal corresponds to a combined waveform in which a trapezoidal waveform which forms the gentle portion and a flat portion having the offset level and an inverted impulse-shaped waveform which forms the impulse portion are combined. It is possible to prepare and store in advance the waveform data of the combined waveform and read and use the stored waveform data. Alternatively, it is also possible to generate the waveform data of the combined waveform by synthesizing waveform data of the trapezoidal waveform and the inverted impulse waveform during transmission.

According to another aspect of the present invention, it is preferable that, in the ultrasound diagnosis apparatus, a width of the trapezoidal waveform along a temporal axis direction is 8 times or greater of a width of the inverted impulse-shaped waveform along the temporal axis direction. As these widths, for example, a width corresponding to −20 dB from the peak level is used. In particular, it is preferable that the former is 15 times or greater of the latter.

According to another aspect of the present invention, it is preferable that the ultrasound diagnosis apparatus further comprises a receiver which processes a reception signal from the ultrasonic transducer, and an image processor which extracts at least one of a fundamental component and a harmonic component included in the reception signal after the reception signal is processed in the receiver and forms an image.

According to another aspect of the present invention, there is provided an ultrasound diagnosis apparatus comprising an ultrasonic transducer which transmits and receives an ultrasound, and a transmitter which supplies a first transmission signal and a second transmission signal to the ultrasonic transducer, wherein the first transmission signal includes a first gentle portion having a shape which gently changes between a base line and an offset level on one polarity side and a first impulse portion having a shape which extends from the offset level on the one polarity side, over the base line, and into an opposite polarity side, and the second transmission signal includes a second gentle portion having a shape which gently transitions between the base line and an offset level on the opposite polarity side and a second impulse portion having a shape which extends from the offset level on the opposite polarity side, over the base line, and into the one polarity side.

According to another aspect of the present invention, it is preferable that, in the ultrasound diagnosis apparatus, the first transmission signal and the second transmission signal form a transmission signal pair for forming an ultrasound image by a pulse inversion method, and the first transmission signal and the second transmission signal are in an inverted relationship about the base line.

According to another aspect of the present invention, there is provided an ultrasound diagnosis apparatus comprising an ultrasonic transducer which transmits and receives an ultrasound, and a transmitter which supplies a transmission signal to the ultrasonic transducer, wherein the transmission signal includes a first waveform portion and a second waveform portion which are formed in temporally different positions, the first waveform portion includes a first gentle portion which gently changes between a base line and an offset level on one polarity side and an impulse portion having a shape which extends from the offset level, over the base line, and into an opposite polarity side, and the second waveform portion includes a second gentle portion which gently changes between the base line and an offset level on the opposite polarity side and which is in an opposing polarity relationship with the first gentle portion.

When this structure is employed, the impulse portion is formed over (across) the base line in the first waveform portion, and, thus, a large voltage change can be effected by the impulse portion as a whole without increasing the voltage tolerance of the individual circuits corresponding to the positive and negative polarities (that is, without the use of a high voltage circuit). In other words, a pulse waveform which is equivalent to a simple pulse with a high voltage can be formed and a high sensitivity and high resolution (high axial resolution) can be achieved. According to another aspect of the present invention, it is preferable that, in the ultrasound diagnosis apparatus, charges accumulated in the transmitter by a preceding waveform portion, of the first waveform portion and the second waveform portion, is removed or reduced by a following waveform portion, of the first waveform portion and the second waveform portion. In other words, all or a part of charges accumulated due to the first gentle portion is cancelled by the second gentle portion of the opposite polarity, and, thus, it is possible to prevent destabilizing an operation of the transmitter in advance and allow the transmitter to properly operate. The first waveform portion and the second waveform portion are preferably in an axisymmetric relationship about the base line, but need not have the same shape. A time lag may be present between the first waveform portion and the second waveform portion. However, if the first waveform portion and the second waveform portion are temporally continuous, an overall length of the transmission signal can be reduced, and, thus, the data on the waveform memory can be reduced.

According to another aspect of the present invention, it is preferable that, in the ultrasound diagnosis apparatus, the second waveform portion precedes the first waveform portion. When the second waveform portion is formed after the first waveform portion, there may be generated a problem of extension of the transmission wave to the reception period. In order to prevent this problem, it is preferable to form the second waveform portion preceding the first waveform portion.

According to another aspect of the present invention, it is preferable that, in the ultrasound diagnosis apparatus, a frequency band of the second gentle portion is substantially at a lower band side than a frequency band of the ultrasonic transducer. With this structure, the second gentle portion is substantially not converted as an ultrasound, and, thus, it is possible to prevent transmission of an unnecessary ultrasound. This is also similarly true for the first gentle portion. According to another aspect of the present invention, it is preferable that, in the ultrasound diagnosis apparatus, the second gentle portion is substantially in an asymmetrical to the first gentle portion about the base line.

DESCRIPTION OF PREFERRED EMBODIMENT

A preferred embodiment of the present invention will now be described with reference to the drawings.

Figure 1:
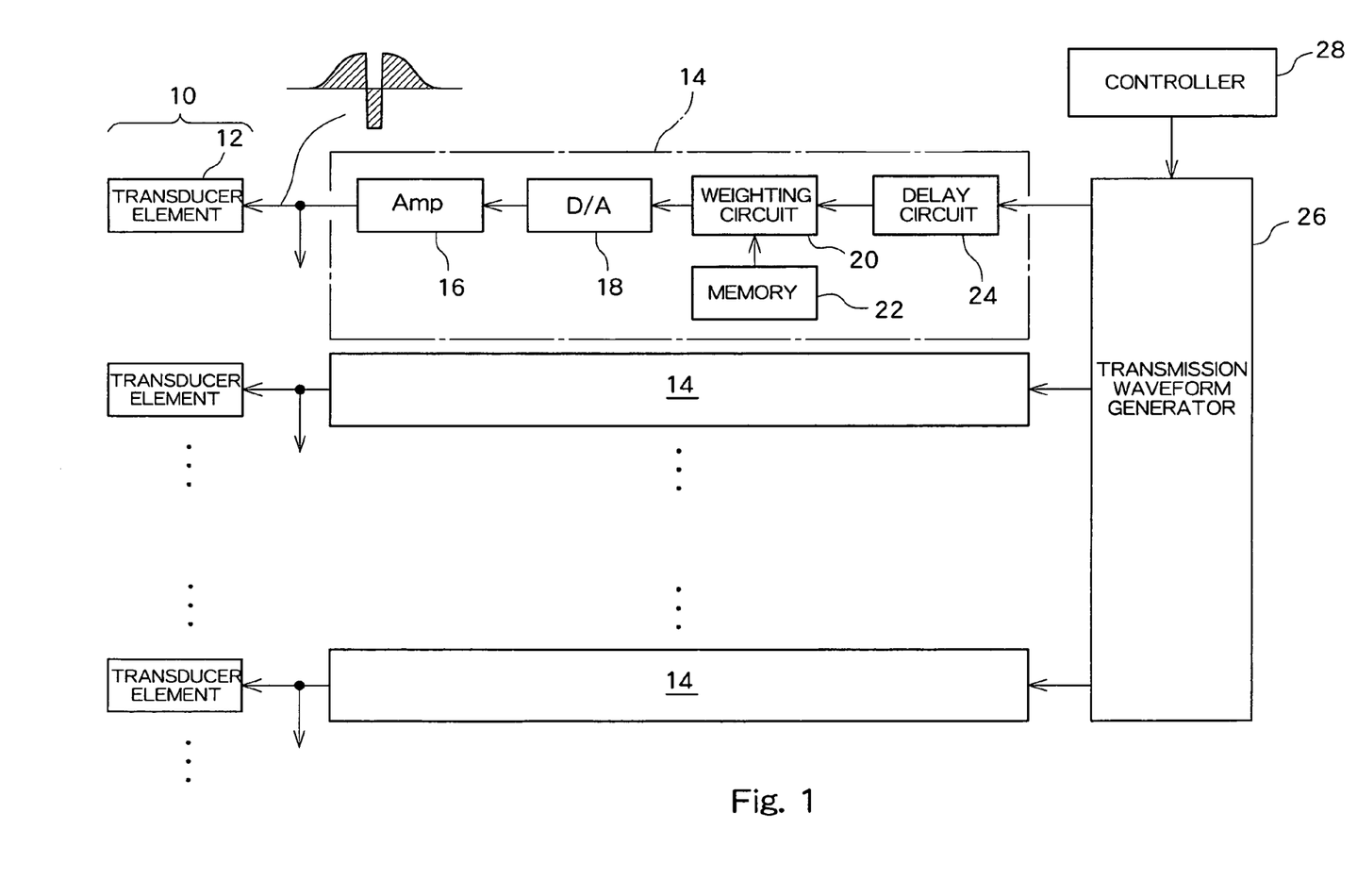
FIG. 1 is a block diagram showing an ultrasound diagnosis apparatus according to a preferred embodiment of the present invention.

FIG. 1 is a block diagram showing a structure of a transmitter in an ultrasound diagnosis apparatus according to a preferred embodiment of the present invention. The ultrasound diagnostic apparatus is used in the medical field, and is an apparatus which transmits and receives an ultrasound to and from a living body and forms an ultrasound image based on a reception signal thus obtained.

In an ultrasound probe (not shown), an array transducer 10 is provided. The array transducer 10 comprises a plurality of transducer elements 12. In the present embodiment, a plurality of transducer elements 12 which are one-dimensionally arranged are provided as the array transducer 10. An ultrasound beam is formed with the transducer elements 12, and the ultrasound beam is electrically scanned. As an electrical scanning method, various methods are known such as an electric sector scanning and an electric linear scanning. Alternatively, it is also possible to provide a two-dimensional (2D) array transducer in place of the one-dimensional (1D) array transducer, to form a three-dimensional data capturing region.

A transmission waveform generator 26 comprises a memory, such as a RAM, in the present embodiment. Writing and reading to and from the RAM is controlled by a controller 28. The controller 28 is a host controller which controls operations of the components in the ultrasound diagnosis apparatus. When the controller 28 supplies a trigger signal to the transmission waveform generator 26, the transmission waveform generator 26 outputs digital data which represents a transmission waveform stored in the trigger signal. The digital data is sent to a plurality of transmission circuits 14 which are provided in parallel to each other. In the present embodiment, a transmission signal having a unique waveform shape is generated by the transmission waveform generator 26. The waveform of the transmission signal is described in greater detail with reference to FIG. 2 and other figures.

The transmission circuit 14 will now be described. A delay circuit 24 executes a delay process on input digital data in order to form a transmission beam. The digital data after the delay process is input to a weighting circuit 20. The weighting circuit 20 executes a weighting process on the input data according to a weighting function stored in a memory 22. The digital data after the weighting process is input to a digital-to-analog (D/A) converter 18. In the D/A converter 18, the transmission signal which is digital data is converted into a transmission signal which is analog data. The converted transmission signal is input to a linear amplifier 16 and is amplified to a necessary voltage by the linear amplifier 16. The transmission signal thus processed is output to the transducer element 12 as a driving signal.

In the transmission circuit 14 shown in FIG. 1, the linear amplifier 16 comprises a positive polarity side circuit and a negative polarity side circuit, and a linear amplification process is executed in each polarity. In the present embodiment, because a unique waveform is employed as the transmission waveform, there is no need to employ countermeasures against a high voltage at each polarity. In other words, a circuit structure is employed in which, for example, a transmission signal of 100 V can be generated at the positive polarity side and a signal of 100 V can be generated at the negative polarity side, and it is not necessary to provide a circuit in which, for example, a signal of 200 V is generated only at one of the polarities. Alternatively, it is also possible to provide a capability in each polarity to generate a higher voltage signal.

In FIG. 1, a switching circuit or the like provided between a transmitter (transmission beam former) and the array transducer 10 is not shown. In addition, a receiver (reception beam former) connected to the array transducer 10 is not shown in FIG. 1. In the present embodiment, a signal processing circuit is connected at the rear stage of the receiver, and the signal processing circuit has a function to apply a signal process to form a harmonic image. When a pulse inversion method to be described later is employed, a first transmission signal and a second transmission signal which is an inverted signal of the first transmission signal are alternately transmitted for each beam direction. A signal process such as subtraction and/or addition is applied to two reception signals thus obtained, a necessary harmonic component or a necessary fundamental component is extracted, and an ultrasound image is formed based on these components.

Figure 2:
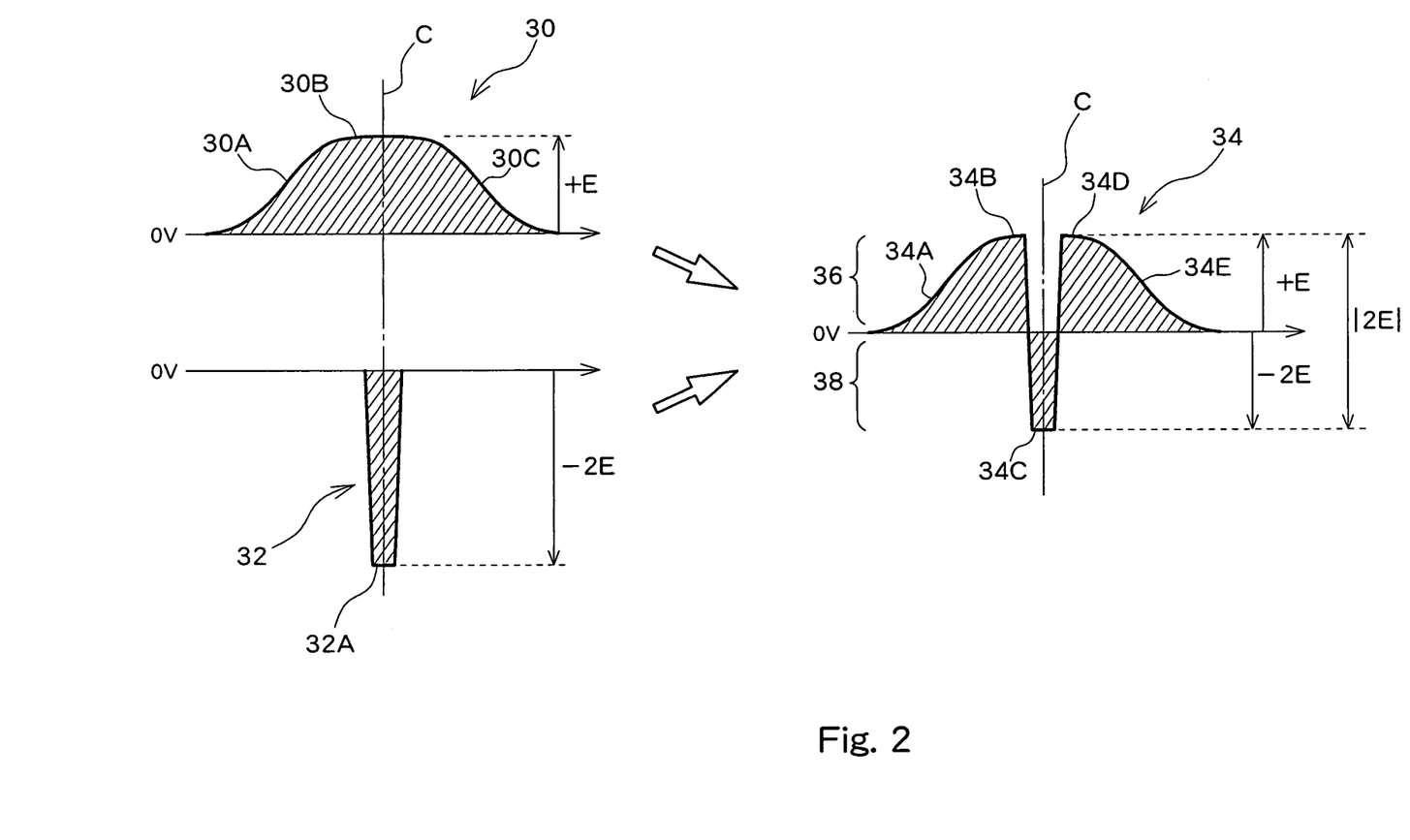
FIG. 2 is a diagram showing a waveform of a transmission signal in a preferred embodiment of the present invention.

Next, a transmission signal in the present embodiment will be described referring to FIG. 2. Reference numeral 34 represents a transmission signal supplied to each transducer element. A waveform of the transmission signal 34 corresponds to a combined waveform in which a trapezoidal waveform 30 and an inverted impulse-shape waveform (may also be called simply an impulse-shaped waveform) 32 are added. The trapezoidal waveform 30 in this example configuration exists only on the positive polarity side, and includes a flat portion 30B which forms an offset level and slope portions 30A and 30C existing before and after the flat portion 30B. In the example configuration, two slope portions 30A and 30B form a gentle portion. The slope portion 30A is a front gentle transit portion and gently changes from a base line of 0 V to an offset level (for example, +E=+100 (V)). The slope portion 30C is a rear gentle transit portion and gently changes from the offset level to the base line. In the example configuration, the trapezoidal portion 30 is symmetric in right and left (in prior time and later time) on the temporal axis about a center line C which is a center. A center frequency of the trapezoidal waveform 30 is very low and is a DC component or near the DC component. The inverted impulse-shaped waveform 32 is a simple pulse-shaped waveform rising from the base line toward the negative polarity side. A peak level 32A of the inverted impulse-shaped waveform 32 is, in this example configuration, approximately twice the offset level ($|-2E|=2\times|+E|$). The inverted impulse-shaped waveform 32 corresponds to an ultrasonic pulse for executing an ultrasonic diagnosis of a living body.

As described above, the waveform of the transmission signal 34 corresponds to a waveform in which the trapezoidal waveform 30 and the inverted impulse-shaped waveform 32 are added and combined. In other words, the transmission signal 34 includes, along the temporal axis direction, a slope portion 34A, a flat portion 34B, an inverted impulse-shaped portion 34C, a flat portion 34D, and a slope portion 34E. Here, reference numeral 36 represents the positive polarity side and reference numeral 38 represents a negative polarity side. In the positive polarity side 36, the overall shape is a mountain-shaped waveform (which is approximately a shape of Gaussian distribution), but the center portion steeply falls in a deep-well shape. That is, a projection shape toward a downward direction is present in the negative polarity side 38. A voltage of the inverted impulse-shaped portion 34C (an absolute value of the voltage) corresponds to twice (an absolute value of) the offset level. With this configuration, an offset level can be formed using a frequency component near the DC component, and the impulse waveform can be generated with the offset level as a basis. Thus, a large waveform change can be generated symmetrical along the upward and downward directions centered on the base line, and a transmission result can be obtained which is similar to the result obtained when a simple pulse which achieves a high resolution and high sensitivity is transmitted. In addition, if each polarity is considered, the peak voltage E can be limited to a certain value. Because of this, it is not necessary to employ high voltage structures for the positive polarity side circuit and the negative polarity side circuit. Because the trapezoidal waveform is substantially ignored in transmission and reception of an ultrasound, there would not be any adverse influence due to formation of the trapezoidal waveform, and, even if such an influence occurs, the influence will be small, and no significant problems will arise.

The width of the trapezoidal waveform is desirably 8 times or greater, and more desirably 15 times or greater, of the width of the impulse-shaped portion. The width described here is a width, for example, at −20 dB from the peak. The slope portion can be defied using, for example, $\cos^n$ function, with n being a value such as 3, or, alternatively, a configuration may be employed in which the number n can be varied. Alternatively, the shape of the slope portion (or the trapezoidal waveform may be defined using a linear function for defining a shape such as a triangular wave or a Gaussian function.

Figure 3:
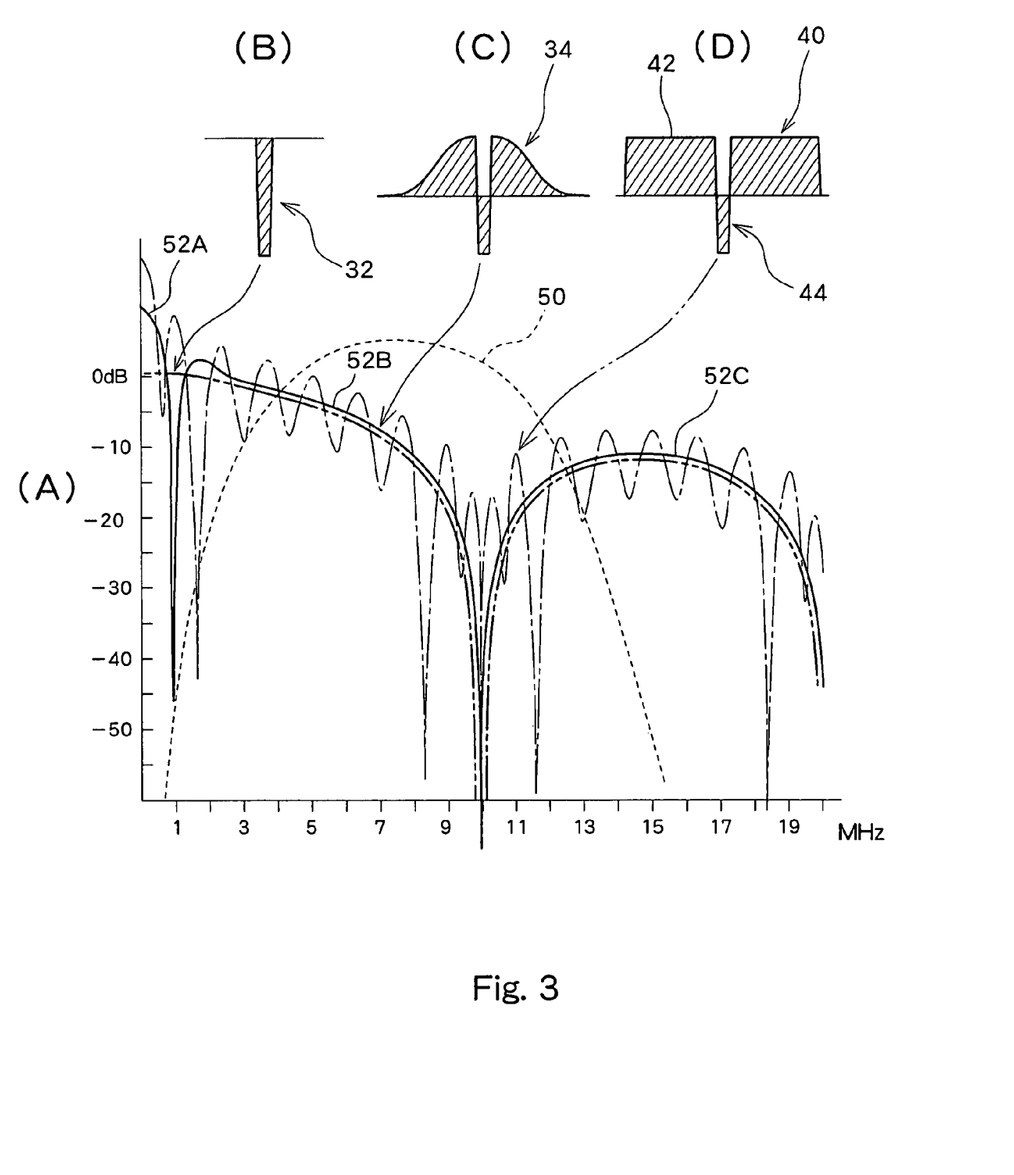
FIG. 3 is a diagram for explaining a spectrum of the transmission signal shown in FIG. 2 in comparison with a comparative example.

FIG. 3 shows frequency spectra for several transmission signals. FIG. 3(A) shows a plurality of frequency spectra wherein a horizontal axis represents a frequency and a vertical axis represents power of each frequency component. FIG. 3(B) shows a transmission signal 32 as a first comparative example and which is a simple single pulse with a high voltage. FIG. 3(C) shows a transmission signal 34 according to the present embodiment. FIG. 3(D) shows a transmission signal 40 as a second comparative example, which corresponds to a signal in which the gentle trapezoidal waveform in the transmission signal 34 is replaced with a rectangular waveform. In other words, the transmission signal 40 includes a rectangular waveform 42 and an impulse portion 44. The rectangular waveform 42 has a flat portion having a level which is equal to the offset level in the transmission signal 34.

In FIG. 3(A), a broken line 50 represents a band of the ultrasonic transducer. In the example configuration, a width of the frequency band is 5.5 MHz and a center frequency is 7.5 MHz. A spectrum of the transmission signal 34 represented by a solid line approximately matches a spectrum of the transmission signal 32 which is shown with two-dots-and-chain line. The spectra do not match in the component 52A near the DC, but this component can be substantially ignored in consideration of the band 50 of the ultrasonic transducer. A spectrum of the transmission signal 40 shown by a dot-and-chain line has a significant ripple component (side lobe component) in the fundamental component, and, because of this, a second order harmonic also has a ripple component. Because of this, a problem may arise such as a reduction in axial resolution when the transmission signal 40 is used.

As described, with the transmission signal 34, a spectrum which is approximately equal to that of the transmission signal 32 can be obtained, the axial resolution can be improved with such a spectrum, and a high sensitivity can be achieved. In addition, a high voltage circuit which is required for generating the transmission signal 32 is not necessary.

With the transmission signal 34, because the offset level is formed using the gentle portion, there is an advantage that the unnecessary ripple component which is observed in the spectrum of the transmission signal 40 can be removed. With the transmission signal 34, there is an advantage that the image quality of an image can be improved when an image is formed, in particular, for a harmonic component.

Figure 4:
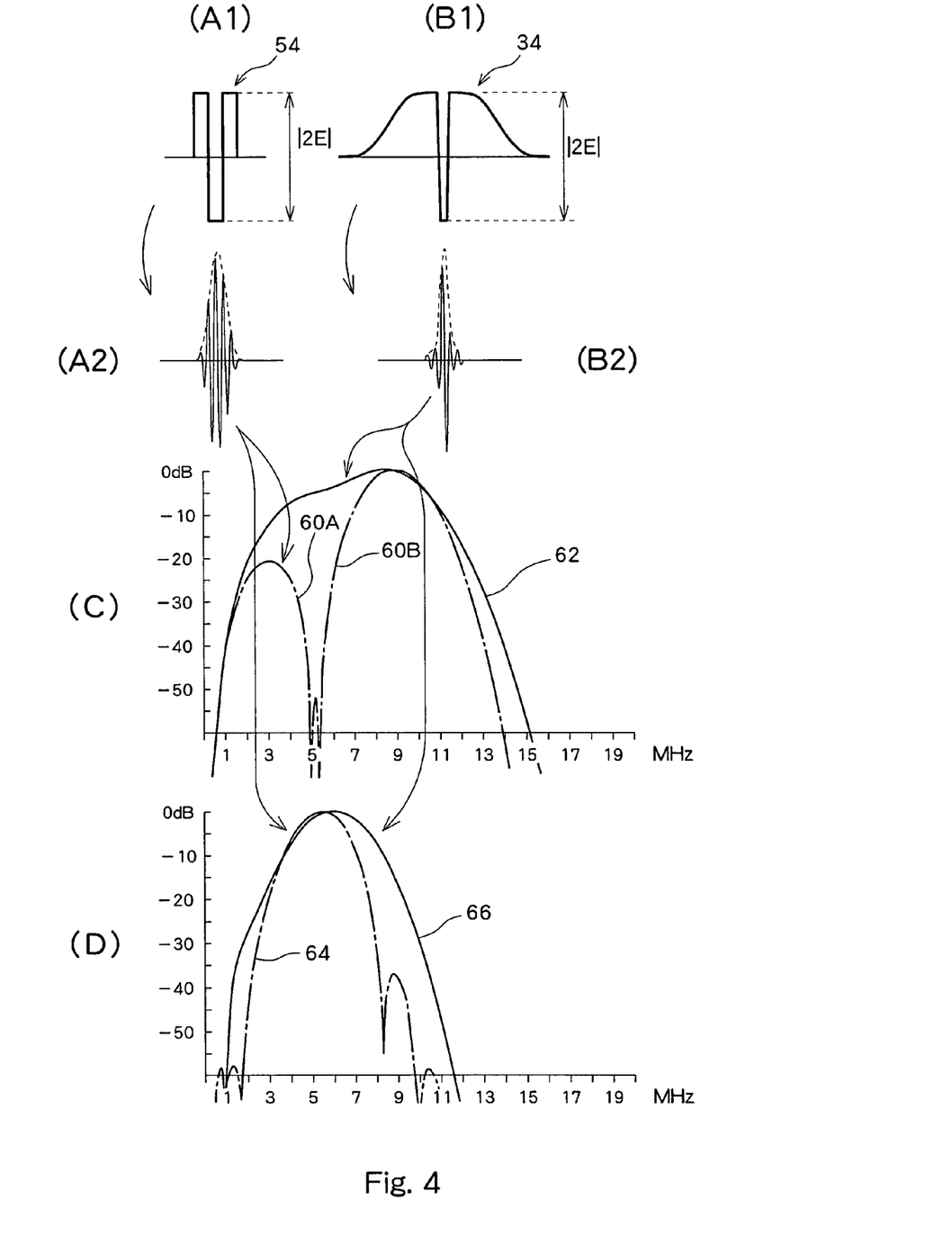
FIG. 4 is a diagram for explaining a band of axial resolution for the transmission signal shown in FIG. 2 in comparison with a comparative example.

Next, an advantage of the transmission signal 34 regarding the axial resolution will be described referring to FIG. 4. FIG. 4(A1) shows a transmission signal 54 as a third comparative example and FIG. 4(B1) shows the transmission signal 34 according to the present embodiment. The transmission signal 54 is a signal which generates a harmonic reception sensitivity which is approximately equal to the transmission signal 34, has an amplitude of |2E| over the positive and negative values similar to the transmission signal 34, and corresponds to a pulse of 1.5 waves. With the reception sensitivity thus set at a certain value, the axial resolutions of the two transmission signals will be compared. The conditions for obtaining the simulation result of FIG. 4 are: 7.5 MHz for the center of the frequency band of the ultrasonic transducer, 5 MHz for the transmission frequency, and 0.5 dB/cm/MHz for an attenuation characteristic. The depth of the point reflection structure is 25 mm.

FIG. 4(A2) shows a waveform of a harmonic component included in a reception signal from a point reflection structure when the transmission signal 54 is used. Similarly, FIG. 4(B2) shows a waveform of a harmonic component included in a reception signal from the point reflection structure when the transmission signal 34 is used. As shown in these figures, the width of the waveform when the transmission signal 34 is used is narrower than the width of the waveform when the transmission signal 54 is used. For example, when a point of reference is taken at −12 dB level from the peak, the width in the distance direction in the case of the transmission signal 54 is calculated to be 0.303 mm whereas the width in the distance direction in the case of the transmission signal 34 is 0.161 mm. In this manner, with the use of the transmission signal 34, the performance can be approximately doubled in the axial resolution compared to the case when the transmission signal 54 is used. FIG. 4(C) shows a representation of this from the viewpoint of the spectrum. A dot-and-chain line in FIG. 4(C) represents a spectrum of the harmonic component in the reception signal shown in FIG. 4(A2), and a solid line represents a harmonic component in the reception signal shown in FIG. 4(B2). The spectrum shown with the dot-and-chain line includes a spectrum portion 60A (zeroth order harmonic component) and a spectrum portion 60B (second order harmonic component). The spectrum portion 60A of the zeroth harmonic component is small because the harmonic component is limited by the frequency band of the ultrasonic transducer. According to the present embodiment, as shown by a solid line represented by reference numeral 62, the zeroth order harmonic component and the second order harmonic component widen along the frequency axis direction and are combined to form a large mountain-shaped spectrum. This means that the band has been increased, and, thus, the axial resolution has been improved. FIG. 4(D) shows a spectrum for a fundamental component included in the reception signal. A spectrum 64 represented by a dot-and-chain line represents a fundamental component corresponding to the harmonic component included in the reception signal shown in FIG. 4(A2) and a spectrum 66 represented by a solid line represents a fundamental component corresponding to a harmonic component included in the reception signal shown in FIG. 4(B2). According to the present embodiment, the band is also increased with regard to the fundamental component.

Figure 5:
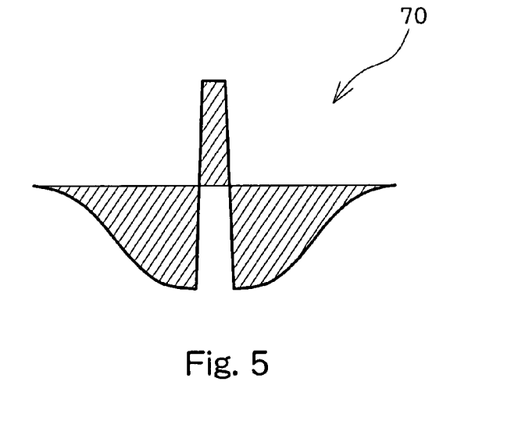
FIG. 5 is a diagram showing a transmission signal in which the transmission signal shown in FIG. 2 is inverted.

Next, another example transmission signal will be described. A transmission signal 70 shown in FIG. 5 has a transmission waveform in which the transmission signal 34 shown in FIG. 2, etc. is vertically inverted about the baseline. Advantages similar to those obtained with the transmission signal 34 as described above can be obtained when a transmission signal 70 of this type is employed. When a pulse inversion method is executed, the transmission signal 34 (FIG. 2, etc.) and the transmission signal 70 (FIG. 5) are alternately transmitted in a time divided manner. The harmonic component can be extracted while the fundamental component is cancelled or the fundamental component can be extracted while the harmonic component is cancelled, with a subtraction calculation, an addition calculation, etc. using the two reception signals obtained based on the two transmission signals. Various methods are known or have been proposed for the pulse inversion method.

Figure 6:
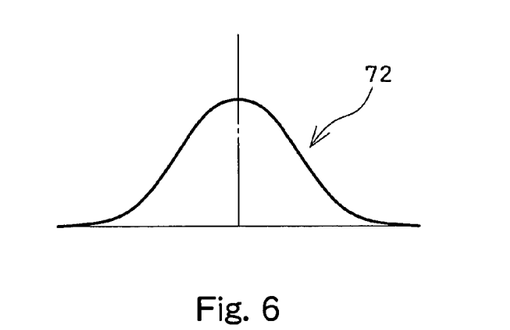
FIG. 6 is a diagram showing another example of a trapezoidal waveform.
Figure 7:
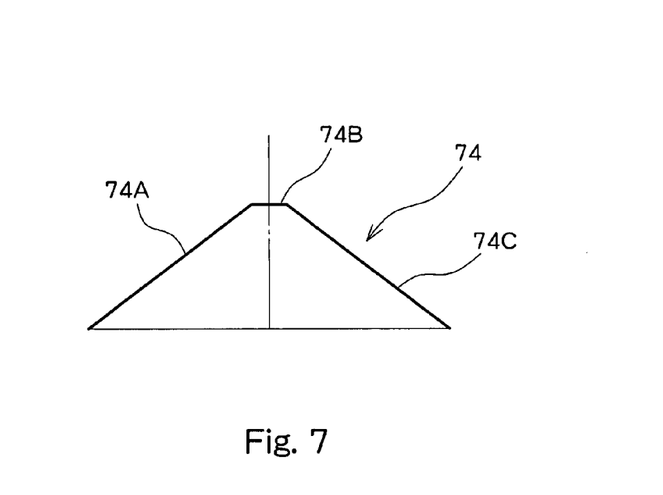
FIG. 7 is a diagram showing yet another example of a trapezoidal waveform.

FIGS. 6 and 7 show another example waveform of a waveform portion for forming the offset when defining the transmission signal 34. These figures correspond to the trapezoidal waveform shown in FIG. 2 with reference numeral 30. FIG. 6 shows a trapezoidal waveform 72 which follows a Gaussian function and FIG. 7 shows a trapezoidal (approximate triangular) waveform 74 which follows a linear function. The waveform 74 includes a linear slope portion 74A, a flat portion 74B, and a slope portion 74C. An impulse-shaped portion (not shown) is combined to all or a part of the flat portion 74B.

Figure 8:
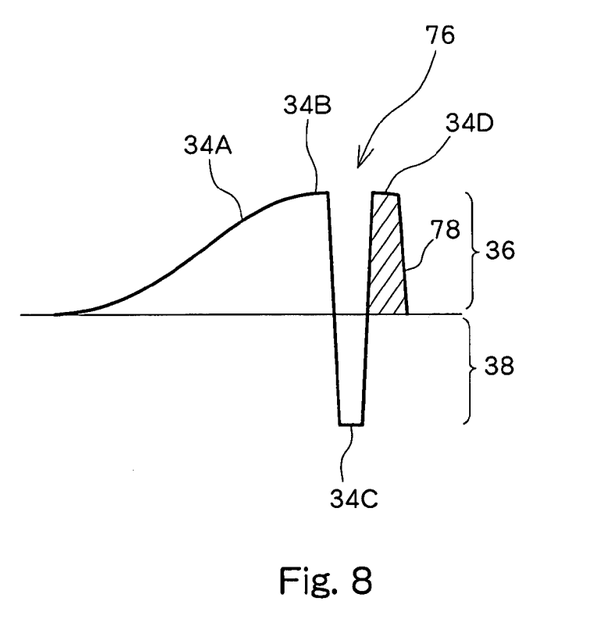
FIG. 8 is a diagram showing a transmission signal in which a slope portion is formed on one side of an impulse-shaped portion and a pulse-shaped portion is formed on the other side of the impulse-shaped portion.
Figure 9:
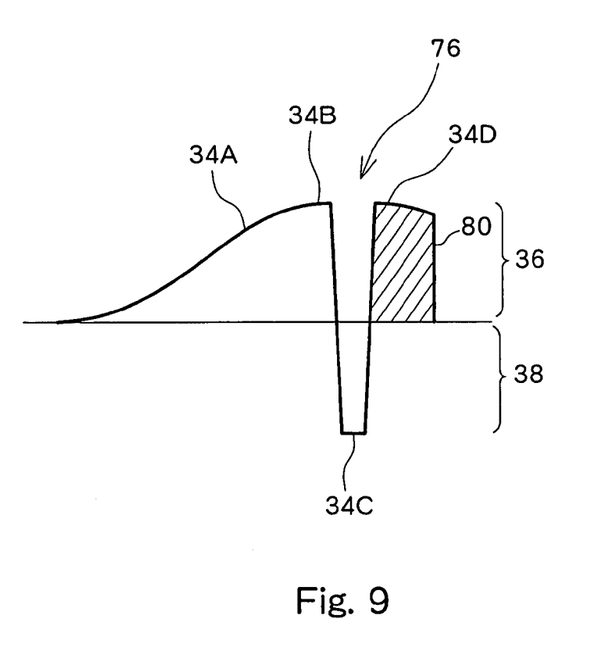
FIG. 9 is a diagram showing a transmission signal in which a slope portion is formed on one side of an impulse-shaped portion and a pulse-shaped portion is formed on the other side of the impulse-shaped portion.

FIGS. 8 and 9 show transmission signals 76 and 76A in which a slope portion is provided in front (or in back) of the impulse-shaped portion, and a pulse-shaped portion is provided in back (or in front) of the impulse-shaped portion. Similar to the transmission signal 34 described above (FIG. 2, etc.), the transmission signals 76 and 76A include the slope portion 34A, flat portion 34B, impulse-shaped portion 34C, and flat portion 34D. Steep rises 78 and 80 are generated from an end of the flat portion 34D to the base line. In other words, there is a pulse-shaped portion (hatched portion) continuous from the impulse-shaped portion 34C. A width of the pulse-shaped portion may be the same as a width of the impulse-shaped portion 34C (refer to FIG. 8) or may be larger than that of the impulse-shaped portion 34C (refer to FIG. 9). In the transmission signal 76A shown in FIG. 9, the flat portion 74D is slightly longer and a steep fall 80 is generated immediately after the flat portion 34D. The width of the pulse-shaped portion (hatched portion) shown in FIG. 9 is wider than the width of the pulse-shaped portion (hatched portion) shown in FIG. 8. In this manner, a duty ratio can be arbitrarily set. When the transmission signals 76 and 76A of FIGS. 8 and 9 are used, the band is inferior (band is smaller) compared to the case when the transmission signal 34 is used (refer to FIG. 2), but the reception sensitivity is superior (the reception sensitivity can be increased) compared to the transmission signal 34. In other words, the transmission signals 76 and 76A of FIGS. 8 and 9 are preferable when the reception sensitivity is of a higher priority than the axial resolution. The transmission signal 76A of FIG. 9 is inferior in reception sensitivity, but is superior in the band compared to the transmission signal 76 of FIG. 8. Alternatively, it is also possible to use transmission signals in which the transmission signals 76 and 76A of FIGS. 8 and 9 are inverted, respectively.

Figure 10:
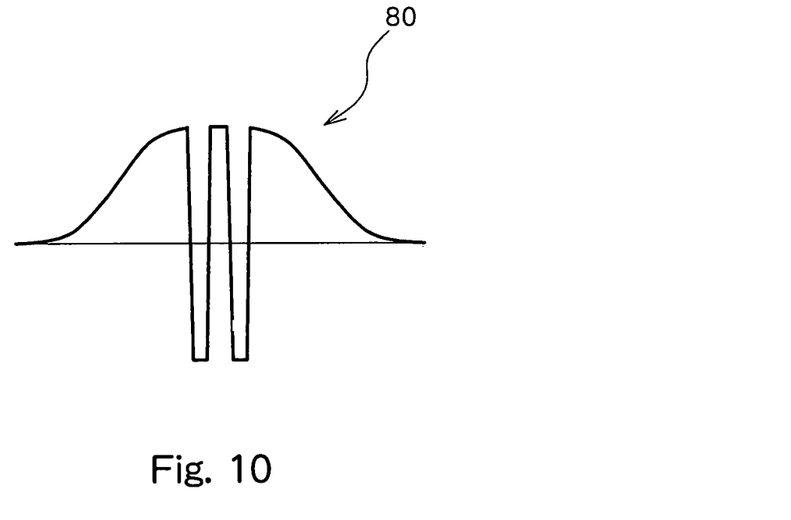
FIG. 10 is a diagram showing a transmission signal including a plurality of impulse-shaped portions.
Figure 11:
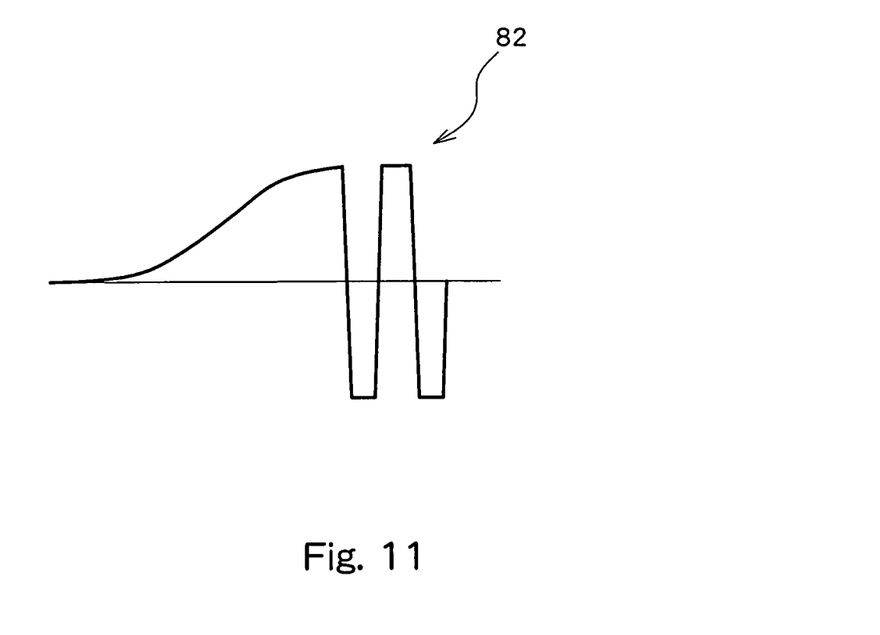
FIG. 11 is a diagram showing another transmission signal including a plurality of impulse-shaped portions.

FIGS. 10 and 11 show other example configurations. In the example signal of FIG. 10, a transmission signal 80 includes two impulse waveforms. Similarly, in FIG. 11 also, a transmission signal includes two impulse portions. Although it is also possible to include three or more impulse portions, the number of impulse portions is preferably minimized, and more preferably is one, in view of expansion of the band.

The transmission signal of the present embodiment can be used in various operation modes such as a mode in which a tomographic image is formed, a mode in which a three-dimensional image is formed, and a mode in which Doppler information is obtained.

Figure 12:
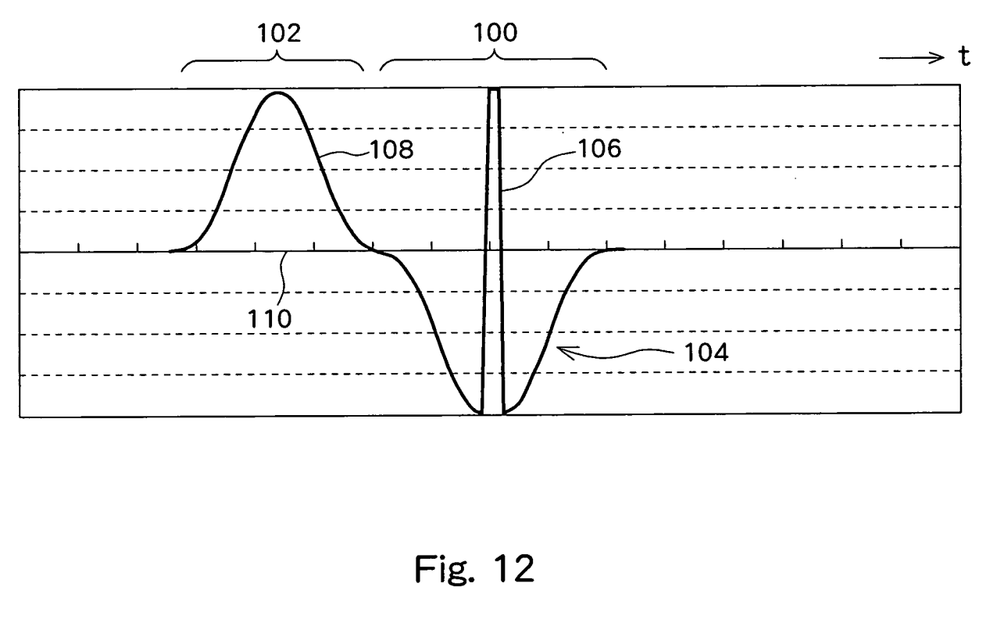
FIG. 12 is a diagram showing a transmission signal to which a preceding portion is added.

Another example transmission signal will now be described. In the example configuration shown in FIG. 12, a transmission signal has a main portion (or following portion) 100 and a preceding portion 102. The main portion 100 and the preceding portion 102 are temporally continuous, and the preceding portion 102 exists before the main portion 100. Alternatively, it is also possible to provide a blank period between the main portion 100 and the preceding portion 102. The main portion 100 includes a combination of a trapezoidal waveform 104 having a gentle mountain shape and an impulse-shaped portion 106 which extends from a vertex of the trapezoid, over the base line, and reaching the opposite polarity. The trapezoidal waveform 104 in this example configuration is in the negative polarity side, and forms a first gentle portion. The preceding portion 102 in this example configuration exists in the positive polarity side by a gentle mountain-shaped trapezoidal waveform 108. The trapezoidal waveform (second gentle portion) 108 is axisymmetric with the trapezoidal waveform 104 about the base line. In other words, the trapezoidal waveforms 104 and 108 have similar shapes, although the polarities differ from each other. The frequency band of the trapezoidal waveform 108 is around the DC component or is at a lower band than the frequency band of the ultrasonic transducer, and is only in rare instances converted to the ultrasound. Thus, transmission of unnecessary ultrasound can be prevented. This is similarly true for the trapezoidal waveform 104.

When the transmission signal is formed only with the main portion 100, charges may be accumulated in the transmitter depending on a circuit structure of the transmitter, in particular, due to the trapezoidal waveform 104, which may destabilize the operation of the transmitter. When the trapezoidal waveform 108 similar to the trapezoidal waveform 104 is added before or after the trapezoidal waveform 104, charges generated by the two trapezoidal waveforms having different polarities can be cancelled, and the problem of the accumulation of the charges can be resolved or reduced. In particular, in the example configuration of FIG. 12, because the waveform portion to be added is the preceding waveform portion, it is possible to prevent a problem in which unnecessary transmission wave extends into the reception period. Alternatively, it is also possible to add the additional waveform portion at the rear of the main portion when such a problem does not occur. The main portion and the additional portion may be temporally distanced, but, with such a configuration, the transmission signal becomes temporally longer and a storage capacity of a waveform memory must be increased. In order to avoid such a problem, it is preferable to set the main portion and the additional portion to be temporally close to each other or to be continuous.

Figure 13:
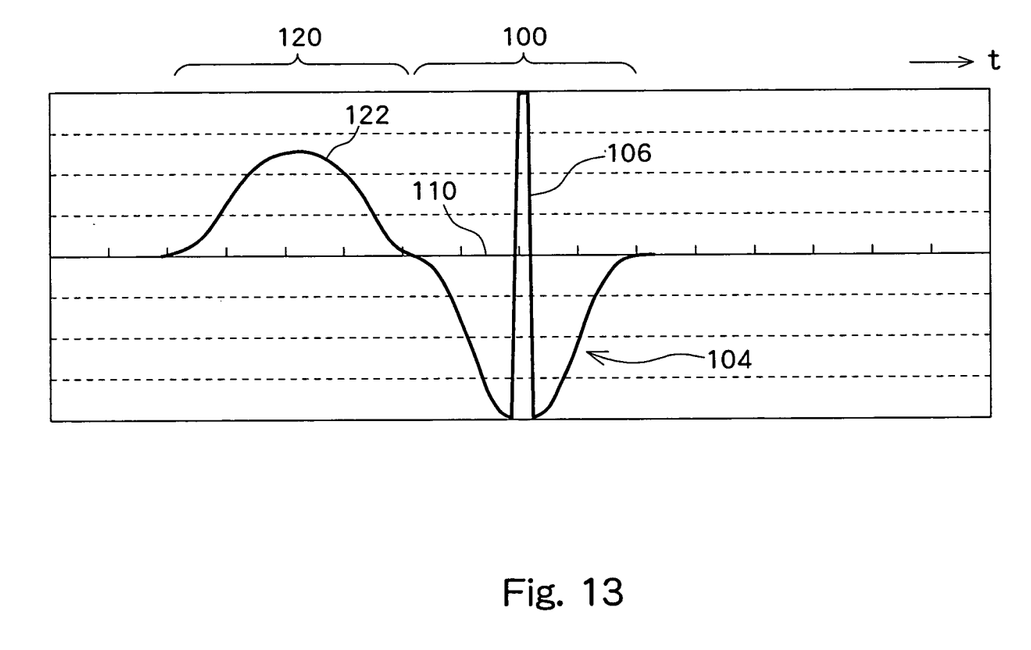
FIG. 13 is a diagram showing another transmission signal to which a preceding portion is added.

FIG. 13 shows yet another example transmission signal. This transmission signal also has the main portion 100 and a preceding portion 120, but the trapezoidal waveform of the main portion 100 differs from a trapezoidal waveform 122 of the preceding portion 120. The trapezoidal portion 122 has a more flat shape. With such a configuration also, unnecessary charges generated in the transmitter can be cancelled. It is preferable to set the area of the trapezoidal waveform 122 to be equal to or close to the area of the trapezoidal portion 104. In the example configurations of FIGS. 12 and 13, it is also possible to employ a steep shape in the front or rear of the trapezoidal waveform. With any of these configurations, by balancing the power in the lower band between the two polarities, accumulation of unnecessary charges can be avoided and the transmitter can be stably operated.

Although the preferred embodiments of the present invention have been described using specific terms, such description is for illustrative purposes only, and it is to be understood that modifications and variations may be made without departing from the spirit or scope of the appended claims.

What is claimed is:

1. An ultrasound diagnosis apparatus comprising:
   an ultrasonic transducer which transmits and receives an ultrasound; and
   a transmitter which supplies an amplitude-modulated carrier transmission signal to the ultrasonic transducer,
   wherein the amplitude-modulated carrier transmission signal includes a gentle modulation envelope portion which has a waveform extending between a base line and an offset level on only one polarity side of the base line, and an impulse envelope portion having an impulse-shaped waveform extending from the offset level, over the base line, and into an opposite polarity side of the base line, and
   wherein the gentle modulation envelope portion has a frequency component with a center frequency at around 0 to 1 MHz and exists substantially outside a frequency band of the ultrasonic transducer along a frequency axis.

2. The ultrasound diagnosis apparatus according to claim 1, wherein the gentle modulation envelope portion includes a front slope portion before the impulse portion and a rear slope portion after the impulse portion.

3. The ultrasound diagnosis apparatus according to claim 1, wherein the gentle modulation envelope portion includes a slope portion at one of either the front or rear of the impulse portion, and
   wherein the transmission signal further includes a pulse-shaper portion which exists in the other of front or rear of the impulse portion and which has a steep rise and a steep fall between the offset level and the base line.

4. The ultrasound diagnosis apparatus according to claim 1, wherein an absolute value of an amplitude between the offset level and a peak level of the impulse envelope portion corresponds to approximately twice an absolute value of an amplitude between the base line and the offset level.

5. The ultrasound diagnosis apparatus according to claim 1, wherein a waveform of the transmission signal corresponds to a combined waveform in which a trapezoidal waveform which forms the gentle modulation envelope portion and a flat portion having the offset level and the impulse-shaped waveform of the impulse envelope portion, inverted relative to the trapezoidal waveform, are combined.

6. The ultrasound diagnosis apparatus according to claim 1, further comprising:
   a receiver which processes a reception signal from the ultrasonic transducer; and
   an image processor which forms an image of a harmonic component included in the reception signal after the reception signal is processed in the receiver.

7. The ultrasound diagnosis apparatus according to claim 1, further comprising:
   a receiver which processes a reception signal from the ultrasonic transducer; and
   an image processor which forms an image of a fundamental component included in the reception signal after the reception signal is processed in the receiver.

8. An ultrasound diagnosis apparatus comprising:
   an ultrasonic transducer which transmits and receives an ultrasound; and a transmitter which supplies a first amplitude-modulated carrier transmission signal and a second amplitude-modulated carrier transmission signal to the ultrasonic transducer, wherein the first amplitude-modulated carrier transmission signal includes a first gentle modulation envelope portion having a waveform extending between a base line and an offset level on only one polarity side of the base line and a first impulse envelope portion having an impulse-shaped waveform which extends from the offset level on the one polarity side, over the base line, and into an opposite polarity side of the base line opposite the one polarity side, wherein the second amplitude-modulated carrier transmission signal includes a second gentle modulation envelope portion having a waveform extending between the base line and an offset level on only the opposite polarity side and a second impulse envelope portion having an impulse-shaped waveform which extends from the offset level on the opposite polarity side, over the base line, and into the one polarity side, and wherein the first and second gentle modulation envelope portions have a frequency component with a center frequency at around 0 to 1 MHz and exist substantially outside a frequency band of the ultrasonic transducer along a frequency axis.

9. The ultrasound diagnosis apparatus according to claim 8, wherein
the first transmission signal and the second transmission signal form a transmission signal pair for forming an ultrasound image by a pulse inversion method, and
the first transmission signal and the second transmission signal are in an inverted relationship about the base line.

10. An ultrasound diagnosis apparatus comprising:
an ultrasonic transducer which transmits and receives an ultrasound; and
a transmitter which supplies an amplitude-modulated carrier transmission signal to the ultrasonic transducer, wherein the amplitude-modulated carrier transmission signal includes a first waveform portion and a second waveform portion which are formed in temporally different positions, wherein the first waveform portion includes a first gentle modulation envelope portion which extends between a base line and an offset level on only one polarity side of the base line and an impulse envelope portion having an impulse shape which extends from the offset level, over the base line, and into an opposite polarity side of the base line opposite the one polarity side, wherein the second waveform portion includes a second gentle modulation envelope portion which extends between the base line and an offset level on only the opposite polarity side and which is in an opposing polarity relationship with the first gentle portion, and wherein the first and second gentle modulation envelope portions have a frequency component with a center frequency at around 0 to 1 MHz and exist substantially outside a frequency band of the ultrasonic transducer along a frequency axis.

11. The ultrasound diagnosis apparatus according to claim 10, wherein charges accumulated in the transmitter by a preceding waveform portion, of the first waveform portion and the second waveform portion, are removed or reduced by a following waveform portion of the first waveform portion and the second waveform portion.

12. The ultrasound diagnosis apparatus according to claim 10, wherein the second waveform portion precedes the first waveform portion.

13. The ultrasound diagnosis apparatus according to claim 10, wherein a frequency band of the second gentle modulation envelope portion is substantially at a lower band side than a frequency band of the ultrasonic transducer.

14. The ultrasound diagnosis apparatus according to claim 10, wherein the second gentle modulation envelope portion is substantially in an axisymmetric relationship with the first gentle modulation envelope portion about the base line.

* * * * *